US 6,601,437 B2
Aug. 5, 2003

(12) United States Patent
Gotowik

(54) APPARATUS FOR TESTING OR ISOLATING A SEGMENT OF PIPE

(75) Inventor: Horst Gotowik, Edmonton (CA)

(73) Assignee: United Testing Corp., Edmonton (CA)

( * ) Notice: Subject to any disclaimer, the term of this patent is extended or adjusted under 35 U.S.C. 154(b) by 0 days.

(21) Appl. No.: 10/266,591

(22) Filed: Oct. 9, 2002

(65) Prior Publication Data
US 2003/0029227 A1 Feb. 13, 2003

Related U.S. Application Data

(62) Division of application No. 09/631,645, filed on Aug. 2, 2000, now Pat. No. 6,467,336.

(30) Foreign Application Priority Data
Jun. 27, 2000 (CA) .............................................. 2312577

(51) Int. Cl.⁷ ................................................ G07M 3/04
(52) U.S. Cl. ..................... 73/49.8; 73/49.5; 73/40.5 R; 73/865.8; 138/89; 138/90
(58) Field of Search ................. 73/49.5, 49.6, 73/49.8, 40.5 R, 40.7, 46, 40.5 A, 49.2, 865.8, 866.5; 138/89, 90

(56) References Cited

U.S. PATENT DOCUMENTS

| 2,155,602 A | 4/1939 | Keulers |
| 2,241,526 A | 5/1941 | Rosenkranz |
| 2,342,616 A | 2/1944 | O'Brien |
| 2,443,944 A | 6/1948 | Bean |
| 2,873,764 A | 2/1959 | Lombard et al. |
| 3,071,960 A | 1/1963 | Knapp et al. |
| 3,726,319 A | 4/1973 | Patterson |
| 3,803,901 A | 4/1974 | McConnell et al. |
| 3,978,678 A | 9/1976 | Duncan et al. |
| 4,211,107 A | 7/1980 | Sleeter et al. |
| 4,332,277 A | 6/1982 | Adkins et al. |
| 4,422,477 A | 12/1983 | Wittman et al. |
| 4,612,961 A | 9/1986 | Vetter |
| 4,753,108 A | 6/1988 | Jänsch |
| 4,875,615 A | 10/1989 | Savard |
| 5,327,942 A | 7/1994 | Black |
| 5,797,431 A | 8/1998 | Adams |
| 5,827,042 A | 10/1998 | Ramsay ...................... 415/112 |
| 5,844,127 A | 12/1998 | Berube et al. |
| 5,924,454 A | 7/1999 | Dyck et al. |
| 6,129,118 A | 10/2000 | Friedrich et al. |

FOREIGN PATENT DOCUMENTS

| CA | 1173668 | 9/1984 |
| CA | 1176189 | 10/1984 |
| CA | 1229053 | 11/1987 |
| CA | 1245077 | 11/1988 |
| CA | 1312557 | 1/1993 |
| CA | 2141956 | 7/1996 |
| CA | 2196523 | 8/1996 |
| CA | 2145792 | 9/1996 |
| CA | 2223247 | 10/1997 |
| EP | 0 328 288 | 8/1989 |
| GB | 2 242 530 | 10/1991 |
| WO | WO 99/54699 | 10/1999 |

Primary Examiner—Raves Raevis
Assistant Examiner—Michael Cygan
(74) Attorney, Agent, or Firm—Irah H. Donner; Hale and Dorr LLP

(57) ABSTRACT

There is described a method and an apparatus for testing or isolating a section of pipe, the apparatus comprising a cylindrical mandrel for insertion into a section of pipe, the mandrel including at least one portion of progressively increasing diameter, and at least one seal disposed around the mandrel and actuatable in response to applied fluid pressure to move along the increasing diameter portion of the mandrel, causing the seal member to radially expand into sealing contact with an inner surface of the pipe.

10 Claims, 6 Drawing Sheets

APPARATUS FOR TESTING OR ISOLATING A SEGMENT OF PIPE

RELATED APPLICATIONS

This application is a Divisional Application of U.S. patent application Ser. No. 09/631,645 filed Aug. 2, 2000, now U.S. Pat. No. 6,467,336, which in turn claims priority to Canadian Application No. 2,312,577 filed Jun. 27, 2000, each of which is hereby incorporated by reference.

FIELD OF THE INVENTION

This invention relates to a tool for testing or isolating a section of any tubing, pipe, flange, fitting, or combination of the same.

BACKGROUND TO THE INVENTION

In industrial applications such as oil or gas refineries, offshore drilling and production platforms, pulp and paper plants, power utilities, pipelines, coiled tubing, oil and gas wells, marine facilities, or any other industry or plant involving piping, the integrity of welds and of flanges or fittings often needs to be tested. In the oil and gas industry, for example, tight environmental and operating regulations exist on emissions from a weld or joint. Further, with thousands of welds in each plant, it is in the industry's interest to minimize the amount of fluid lost in each weld. Testing tools are therefore required to test the integrity and permeability of each weld. Fittings must also be tested after welding to test and confirm structural strength.

Furthermore, in these industries it is often necessary to isolate a section of pipe for various reasons. In maintenance applications, safety dictates that when work is being performed on a section of pipe connected to a system, the portion of the pipe being worked on should be isolated from the rest of the system in order to prevent accidental harm to an operator through fluid discharge in the pipe. Also, when TIG welding or welding stainless steel piping, the oxygen level around the weld should be minimized, necessitating a means of isolating the section around a weld in order to introduce a purge gas. Another application is a positive purge with an inert gas through the tool to a vent point.

These problems are well known, and tools for solving these problems exist in the prior art. For example, U.S. Pat. No. 5,844,127 to Berube et al. teaches a tool to isolate a section of pipe or to test the internal integrity of the pipe. The tool uses two o-rings spaced at a certain distance apart and a method of introducing pressure between the o-rings.

The problem with this design of tool is that o-rings do not provide a good seal. In order for the tool to be able to be inserted into a pipe, the tool's diameter must necessarily be less than the inner diameter of the pipe. The difference is made up by using flexible o-rings. The problem is that because the o-rings are flexible, high pressures will cause the o-rings to extrude into the gap between the tool and the pipe wall, diminishing the effectiveness of the seal. This will cause a slow drop in test pressures even though there may be no leak. The test pressure must then be topped up which will negate a true hydro test in accordance with ASME standards B31.1 and 31.3. After the test pressure is released, the extruded seals may remain wedged in the tool/pipeline gap necessitating that the operator disassemble the tool inside the pipeline for piece by piece removal.

Canadian Patent No. 1,312,557 to Dufort teaches an alternate method whereby a membrane is forced into the pipe wall, creating a seal. However, this tool again has a gap between the tool and the pipe wall, and the membrane will again be distorted under high pressure, negating the effectiveness of the seal.

Other sealing methods in the prior art including using "torquing" methods to set a seal or metal grip in place. This however results in the introduction of "hoop stress" to the inside or outside of the pipe, distorting the pipe and creating a future weak spot. The use of metal grips also creates problems because the inner surface of the pipe is damaged by the torqued connections, potentially creating future crevice corrosion problems. Also when metals are in contact the potential always exists for galvanic corrosion to occur. The longer the metals are in contact, the more severe this problem becomes.

Besides sealing deficiencies, the prior art also fails to teach a tool that is able adaptable to the various configurations required in industry. Tools such as '557 to Dufort are solely for testing weld integrity, and do not provide an isolation tool. Patent no. '127 to Berube discusses both isolation and testing, but does not discuss an adaptation of the tool to aid in low oxygen welding. The lack of these capabilities means that other tools must be used, increasing the costs of maintaining and testing pipes.

SUMMARY

The present invention overcomes the deficiencies of the prior art by creating a sealing means which cannot be extruded under operational pressures. It further provides a tool whose configuration can easily be modified in order to accommodate a number of scenarios, making the tool more versatile by allowing the tool to have multiple purposes.

The present invention uses a novel sealing method in which a seal is compressed into a rigid cavity, preventing the creep problems associated with prior art tools. Because there is no creep, a better seal is formed, allowing tests to be conducted with higher precision results. The lack of creep also makes removing the tool much easier, since the tool will not become jammed within the pipe. This saves the operator time since the tool will not have to be disassembled in situ. The configuration of the seal further allows both low and high pressure sealing, enabling a better seal to be made in either situation. Also, the seal includes a number of ridges along its outer pipe-contacting surface, allowing the seal to accommodate imperfections on the inside wall of the pipe, such as pits or scratches, or to cut through any films or wax buildup on the inside wall of the pipe. All of these improvements create a better seal.

The seal in the present invention is also non-damaging to the pipe. The tool therefore does not cause scratching, galvanic conductance, or torquing stresses. This is a significant improvement over the prior art since the tool does not weaken the integrity of the pipe being tested.

The present invention uses the above novel seal in a number of ways, making the present invention versatile. The tool can be configured to test welds by introducing water at high pressure under the weld and monitoring whether the weld can withstand the pressure. The tool can also be used to test a flange by isolating the flange and again introducing water at high pressure, thus determining whether the flange is properly welded to the pipe.

The tool can further be used to test for leaks in a weld by isolating the section under the weld and introducing helium. By creating a shroud around the outside of the weld and by using a helium testing tool an operator can determine whether or not any leaks exist within the weld.

The tool can further be used as a welding aid. In welds involving certain types of metals it is important to minimize the oxygen level at the weld. The present tool can be used to isolate the down-pipe section of the pipe being welded to facilitate the introduction of inert gas that can be used to create the proper environment for this type of weld.

The unique seal and the versatility of the various configurations of the present invention results in a significant improvement over the prior art.

According to the present invention then, there is provided apparatus for testing or isolating a section of pipe, comprising a cylindrical mandrel for insertion into a section of pipe, said mandrel including at least one portion of progressively increasing diameter; at least one seal member disposed concentrically around said mandrel and actuatable in response to applied fluid pressure to move along said at least one portion, causing said seal member to radially expand into sealing contact with an inner surface of said pipe.

According to another aspect of the present invention, there is also provided a resilient seal member for sealing against the inner surface of a tubular member to contain fluid pressure, said seal member comprising a first portion normally smaller in outer diameter than the inner diameter of said tubular member and being radially expandable into sealing contact with said inner wall, and a second portion normally biased into slidable contact with said inner surface.

According to yet another aspect of the present invention, there is also provided a method of containing a resiliently expandable seal member to constrain its extrusion due to pressure, comprising the steps of providing a resilient seal member that expands radially when subjected to a seal setting force for sealing contact with an opposed surface; and contacting said sealing member during its radial expansion against an axially outwardly disposed member that provides a rigid containment surface constraining extrusion of said sealing member.

BRIEF DESCRIPTION OF THE DRAWINGS

Preferred embodiments of the present invention will now be described by way of example and with reference to the accompanying drawings in which.

DETAILED DESCRIPTION

Figure 1:
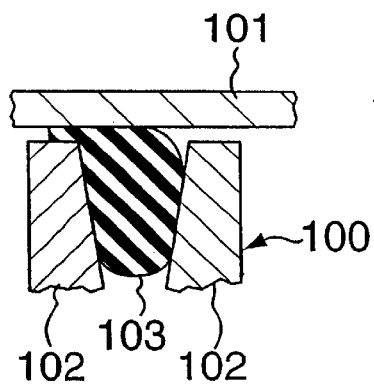
FIG. 1 is a cross sectional view of the prior art method of sealing demonstrating distortion in the o-ring.

FIG. 1 illustrates a typical sealing configuration for prior art testing tools as outlined above in the background section. In this configuration, testing tool 100 is inserted into pipe 101. In order to allow insertion of testing tool 100, the diameter of o-ring supports 102 must necessarily be less than the inner diameter of pipe 101. This creates a gap between the inner wall of pipe 101 and o-ring supports 102.

A seal is created between testing tool 100 and pipe 101 using an o-ring 103. In order for a proper seal to be made, o-ring 103 must be comprised of an elastomer (e.g. neoprene, fluorocarbon, polyurethane, etc.). The problem with this is that the combination of a gap and a flexible material can result in o-ring 103 creeping into the gap when under severe pressure. In extreme cases, the o-ring can be completely extruded through the gap. While the flexibility of o-ring 103 can be altered to reduce this creep, a less flexible material will not create a proper seal when there are imperfections such as pits or scratches on the inside wall of pipe 101. To create a proper seal, o-ring 103 cannot therefore be comprised of a rigid material, and creep becomes an inevitable problem.

Creep in prior art applications reduces the effectiveness of the seal, creating a substandard testing tool. First, creep in the o-rings allows fluid in testing tool 100 to displace the distorted o-rings. Because of this displacement, the pressure of the test fluid will decrease. The issue is that these types of tools are used to test the integrity of welds, and a pressure decrease could be interpreted as a weld problem, even though no such problem exists. A true hydro test according to the ASME B31.1 10 and 31.3 code is thus never achieved.

The creep into the gap between pipe 101 and o-ring supports 102 can result in tool 100 becoming jammed within pipe 101. Thus even when the test pressure and torque loads are removed, tool 100 will still be lodged in place. In order to remove the tool, the time consuming process of disassembling tool 100 within pipe 101 must be undertaken.

Figure 2:
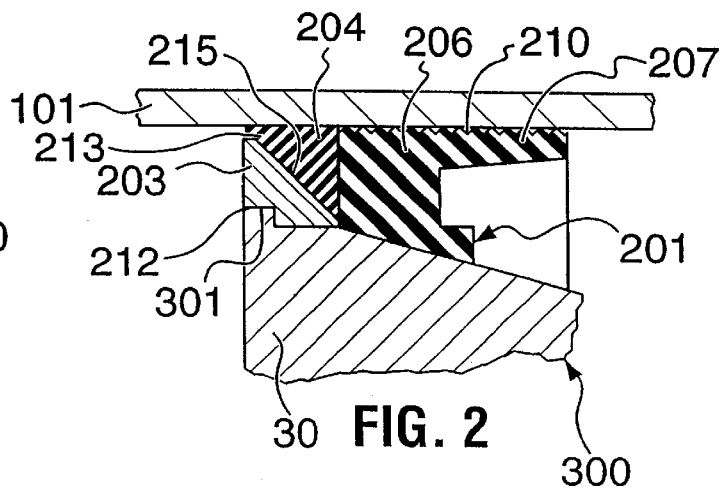
FIG. 2 is a cross sectional view of the sealing means used in the present invention in an engaged position.
Figure 6:
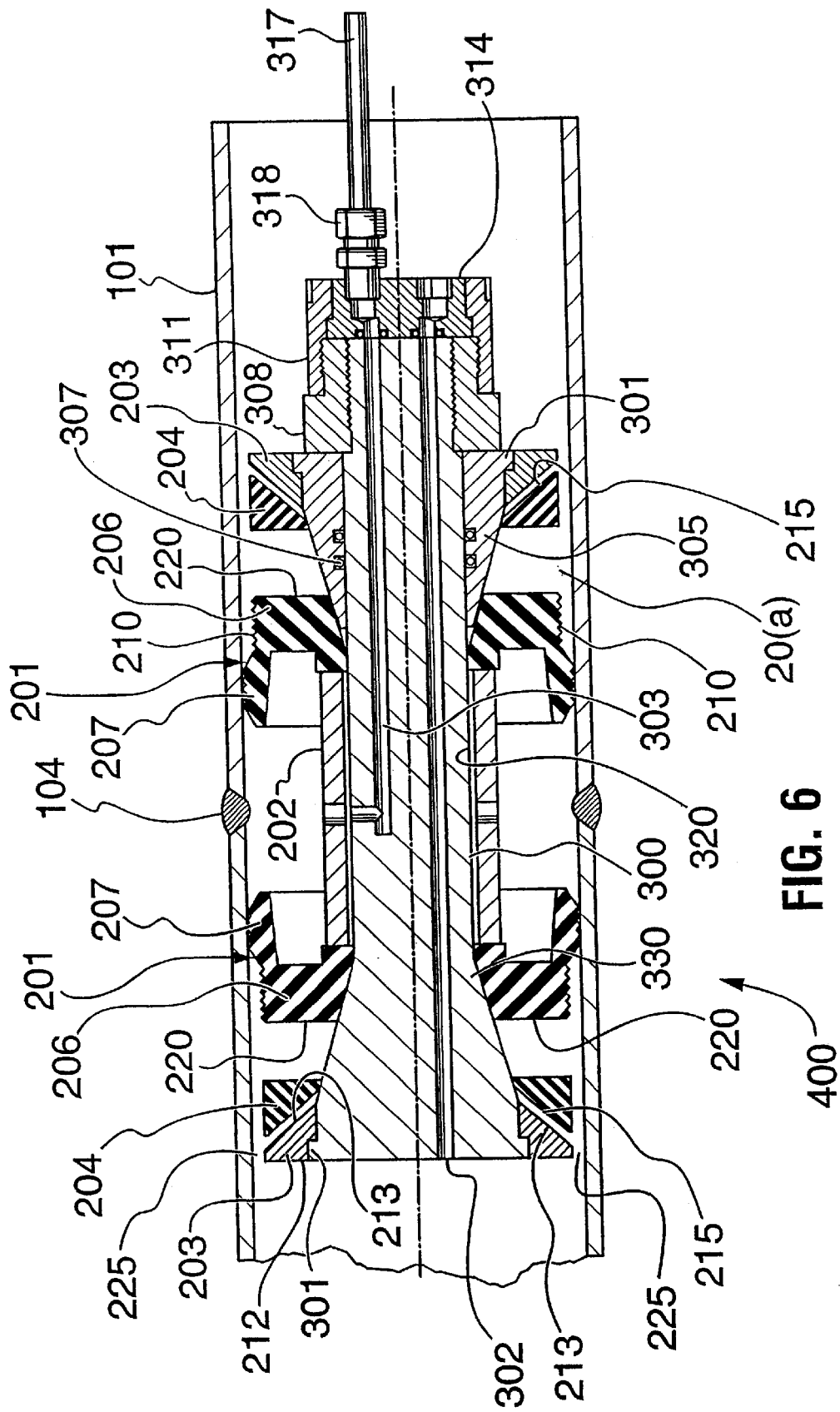
FIG. 6 is a cross sectional view of the present invention in a weld test configuration with the seals in a retracted position.

The present invention overcomes the problem of creep through the use of a seal configuration shown in isolation in FIG. 2 in a pressured-up pipe engaging position, and as part of the present tool shown in its entirety in FIG. 6 in a retracted position prior to the application of seal setting pressure. Due to the lack of gaps in this configuration, pressure on the seal will not cause distortion or creep, allowing a true seal to be formed, and permitted easy extraction of the tool when pressure is released.

Reference will initially be made to FIG. 6 which shows a weld test configuration of the tool 400 in a pipe 101 in a retracted position before being pressured to set the seals and expose a weld 104 to a test pressure. Generally, tool 400 comprises a central, axially extending, cylindrical mandrel 300 which supports on its exterior surface the various spacers, seals and backup rings that will be described below and which are used to form a fluid tight seal between the mandrel and the inner pipeline wall on both sides of the weld.

Mandrel 300 is comprised of a cylindrical portion 320 disposed towards the open end of pipe 101 when mandrel 300 is in use, and a conical section 330 which is disposed away or downstream from the open end of pipe 101, and thus towards the isolated section of the pipe when the mandrel is in use. The conical portion of the mandrel terminates with a circumferentially extending shoulder 301.

As will be described in greater detail below, conical portion 330 of the mandrel provides a ramp up which seal 201 moves when exposed to pressurized fluid for sealing against the inner surface of pipe 101. To provide a similar ramp at the mandrel's upstream end along cylindrical portion 320, the mandrel is fitted with a tapered annular ring or sleeve 305 which corresponds in shape, size and slope to conical section 330, and which similarly includes a shoulder portion 301. A nut 308 is threadedly connected to the mandrel's upstream end to locate ring 305 and to prevent its axial separation from the mandrel. Fluid tight sealing between ring 305 and the mandrel is provided by one or more o-rings 307.

Sealing between the mandrel and the inner pipeline wall is provided as mentioned above by annular resiliently deformable seals 201. Each seal consists of two sections seen most clearly in FIG. 2 and in the retracted position of the tool shown in FIG. 6. Section 206 is a high pressure section which, in the retracted position shown in FIG. 6, has an outer diameter (OD) smaller than the inner diameter (ID) of pipe 101 for clearance with the pipe as the tool is installed and with the weld when the tool is removed. Section 207 is a low pressure section which is normally biased into contact with the pipe's inner wall for a slidable interference fit thereagainst.

Separation between seals 201 in the retracted position shown in FIG. 6 is maintained by a tubular spacer 202 disposed concentrically around the mandrel.

To prevent extrusion of seals 201 under pressure, each end of the mandrel at the culmination of the tapered portion is provided with a combination solid annular ring 203 and a radially expandable conical backup ring 204 preferably made of a rigid substantially noncompressible material such as a hard plastic. A spiral split (not shown) in the ring allows it to expand. Other means of allowing the ring to expand are also contemplated. Rings 203 are each notched at 212 to engage shoulders 301 to prevent their outwards axial separation from the mandrel. Each ring 203 includes an inwardly facing sloped face 213 that slidingly enclages a correspondingly and oppositely sloped face 215 of ring 204. As seals 201 move up the conical portions of the manifold as pressure is applied to the area between the seals, the flat sides 220 of the seals bear against the opposed flat sides of rings 204. The spiral splits in rings 204 allow them to expand and to move up the sloped surfaces of solid rings 203 until the split rings seal the clearance gaps 225 between rings 203 and the inner pipeline wall. Thus, when the tool is fully pressurized, seals 201 are effectively constrained within a rigid cavity defined by the inner pipeline wall, ring combination 203/204 and mandrel 300. This therefore eliminates any pressure induced flow or creep of the seals into any gaps which in turn facilitates a faster and easier removal of the tool following use due to the absence of any seal creep or extrusion-induced lockup. The sealing is self-actualizing and increases with increasing test pressures.

The outer surfaces of the seals that engage the inner pipeline wall are advantageously ribbed or serrated as shown at 210. This profile conforms to any small blemishes in the pipe's inner wall such as pits, seams or scratches, and the ribs will also penetrate any dirt, wax or other loose material coating the pipe. It will be additionally appreciated that the seal design presents a large surface area in contact with the pipeline wall for increased seal integrity. Moreover, the seals themselves are of relatively soft material that will not itself damage coatings applied to some pipe inner diameters.

To pressurize the tool, pressurized fluid is pumped into the annular space between seals 201 via a conduit 303 formed through the mandrel as shown and which discharges through spacer 202 as shown most clearly in FIG. 6. The upstream end of the mandrel is fitted with an adapter 314 held in place by a secondary nut 311 that threads onto primary nut 308. The adapter receives standard couplings 318 to connect conduit 303 to an hydraulic supply line 317 that delivers the pressurized fluid from an external pump. When the test is complete, the same lines are used to exhaust the pressurized fluid and release the tool.

In operation, the tool with supply line 317 attached is inserted into pipe 101 to straddle weld 104. The design of the present tool allows the minimum five centimeters of clearance between the seals on either side of the weld. Pressurized fluid is then introduced into the area between the seals. The fluid is initially contained by the interference fit between the low pressure sections 207 of the seals and the inner pipeline wall to prevent blowby. As the pressure builds, the low pressure sections flatten against the inner pipeline wall and high pressure sections 206 ramp up the tapered portions of the mandrel until complete sealing of portions 206 and 207 with the inner pipeline wall is obtained, as shown most clearly in FIG. 7. Contact between seals 201 and split rings 204 causes the latter to expand ahead of the seals to close the clearance gap between solid rings 203 and the pipe ID. Complete sealing is therefore achieved without any torquing of the tool and the volume of seals 201 ensures that the seals conform to any out of round pipe, as well as tolerating misalignment of the pipe bores at the welds.

When the test is complete, and the test fluid is exhausted from the tool, the elastic nature of the seals allows them to contract which in turn allows the tool to be withdrawn or moved to the next test location. Even when retracted, the low pressure sections of the seals remain in frictional contact with the pipeline walls, to provide some vapour sealing even though internal pressure is absent.

Mandrel 300 can be fabricated advantageously from aluminum or stainless steel. Rings 203 will generally be made of the same material. Split rings 204 are advantageously made from a rigid plastics material, and seals 201 are fabricated from any suitable elastomer, such as neoprene, fluorocarbon, polyurethane and so forth. The material used must be adequate to meet operational pressures including an adequate safety factor, and in specific applications, must also be heat and chemical resistant.

Tool 400 is readily adaptable to various inner diameters of pipe 101. By replacing only rings 203/204, and seals 201, the tool can be configured for various sized pipes. This presents an economical advantage since a new tool does not need to be used for each differently sized pipe.

The tool of the present invention can be used in various configurations, as is illustrated in FIGS. 6, 7, 8, 9, and 10. These various configurations allow the present invention to be used as a weld testing tool, an isolation tool, a welding aid, or a flange testing tool, creating a further advantage of the present invention over the prior art.

Figure 7:
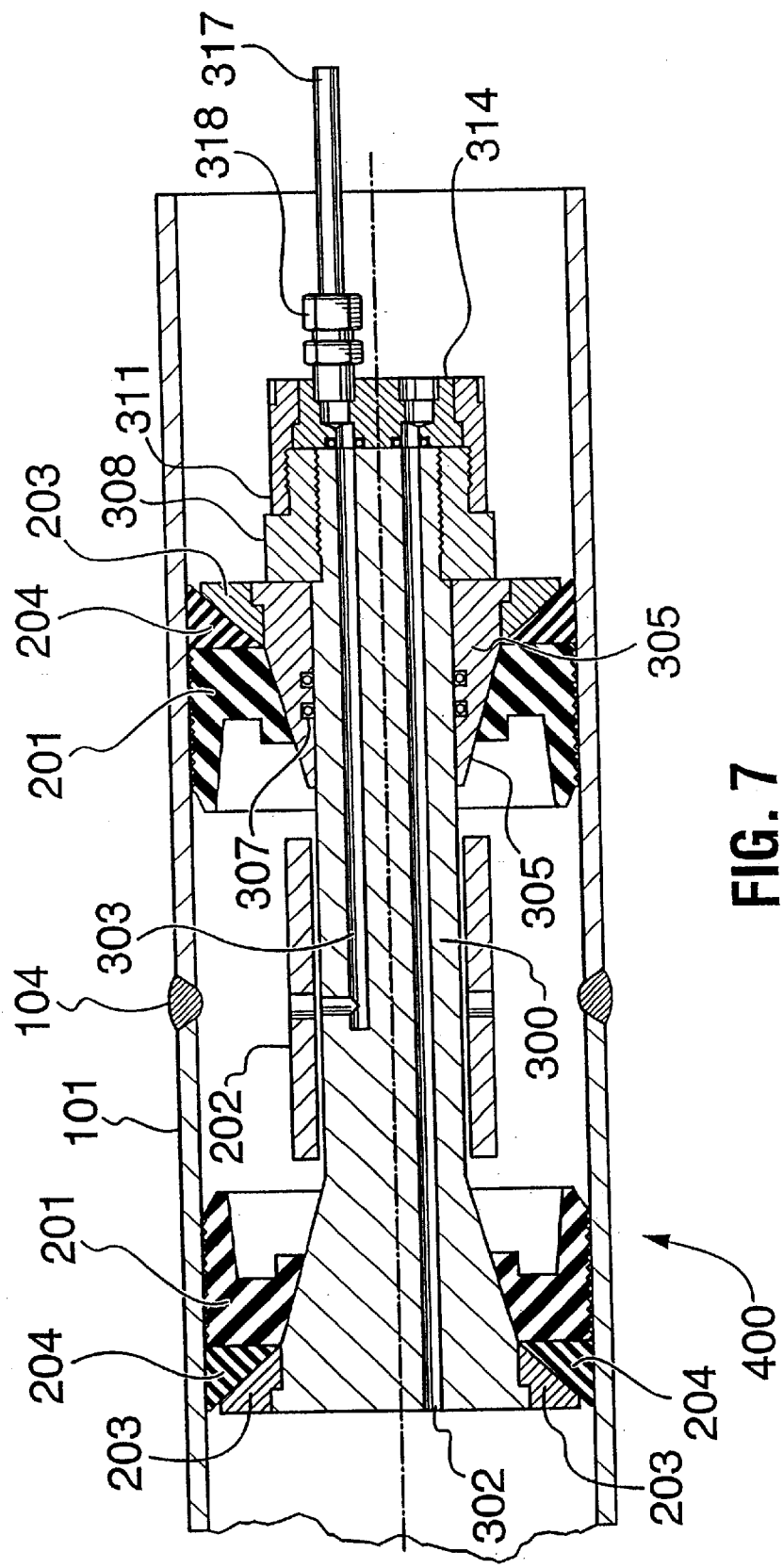
FIG. 7 is a cross sectional view of the present invention in a weld test configuration with the seals engaged.

As previously described, FIGS. 6 and 7 show the present invention in weld test configuration. This configuration involves the creation of a seal on either side of a weld 104 and the introduction of a pre-determined pressure within pipe 101 under weld 104 to test the weld's integrity.

The pressurized fluid, usually water, can be brought to a predetermined pressure, usually 1.5 times the weld operating pressure, at which point the pressure is monitored to ensure that there is no drop. The high pressure of the water ensures the integrity of weld 104 and fulfills ASME B31.1 and B31.3 requirements for weld tests. Further, the Welding Institute (ASME) requires that the test pressure be applied over a minimum area extending five centimeters from each side of the weld which encompasses the heat affected zone.

The weld test configuration can alternatively be used when welding to isolate the down-pipe section of pipe 101 from the weld area. This ensures operator safety and is required by ASME regulations. The tool is simply inserted into pipe 101 beyond the area being welded. The operator then attaches a hydraulic pump to line 317, together with any necessary valves, a vent pipe, and pressure monitors. The tool is charged using the hydraulic pump, and the section of the pipe being worked on is thus isolated.

Figure 8:
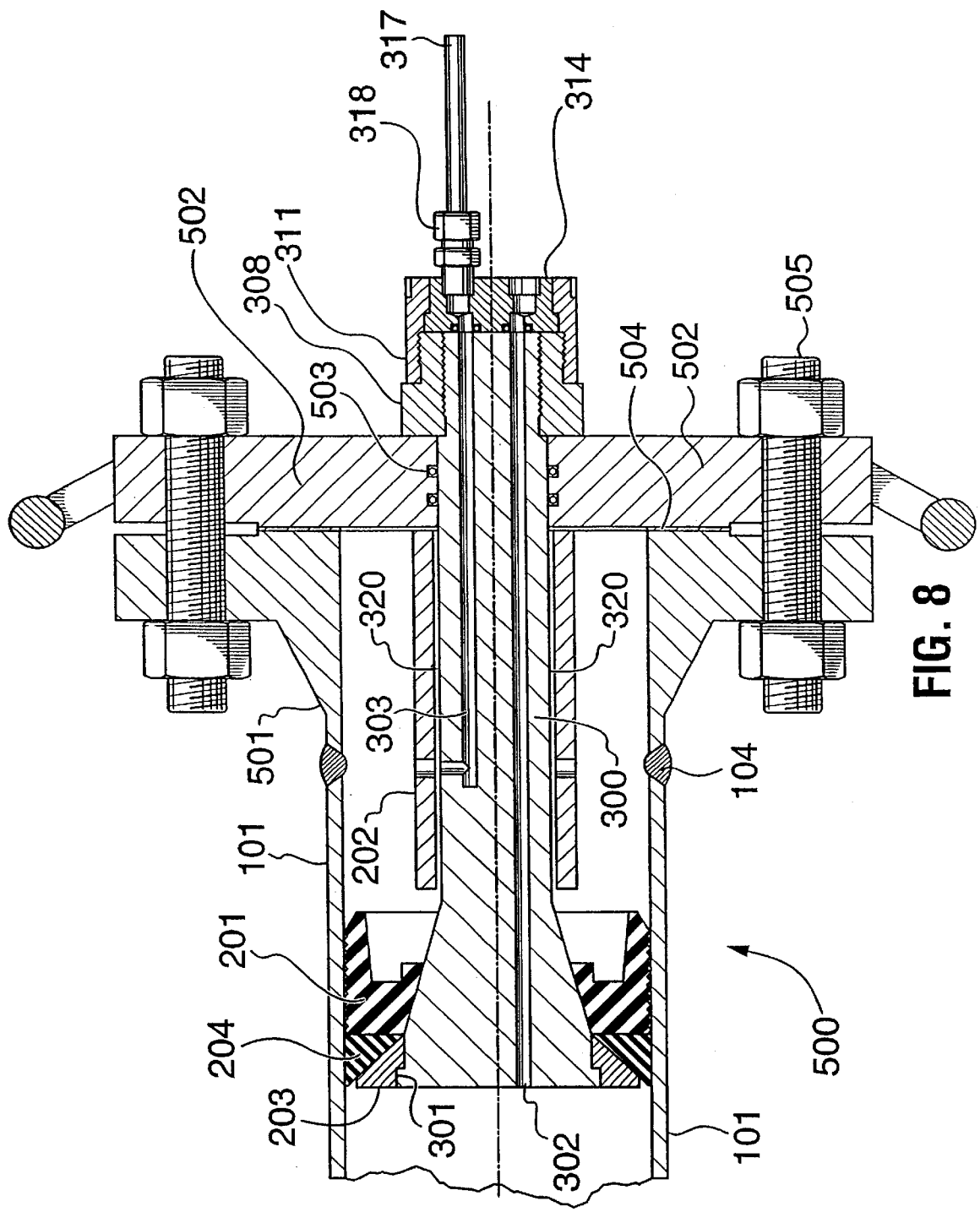
FIG. 8 is a cross sectional view of the present invention in a flange test configuration.

An alternative configuration for the present invention is illustrated in FIG. 8 for flange testing. The purpose of the flange test configuration is to test the integrity of weld 104 which connects flange 501 to the end of pipe 101. Flange tests are well, known in the art.

The flange test configuration is comprised of the same down-pipe elements used for the weld test configuration shown in FIG. 6. Spacer 202 is still disposed about mandrel 300, but may be lengthened as shown to extend all the way to a flange 502 connected to the mandrel and to the welded flange.

In this configuration annular ring 305, upstream seal 201 and rings 203/204 have been replaced by flange 502. Flange 502 is comprised of a centrally bored cylinder whose inner diameter is adapted to fit closely over the outer diameter of cylindrical portion 320 of mandrel 300. Fluid sealing between flange 502 and mandrel 300 is provided by o-rings 503.

Figure 3:
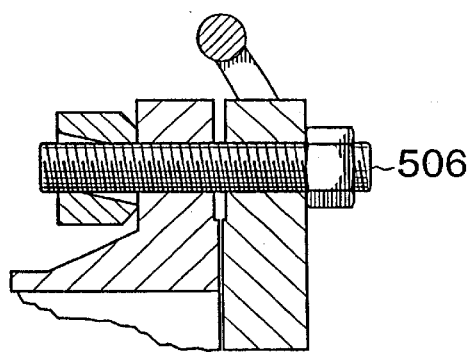
FIG. 3 is a cross sectional view of one type of fastening means for the flange testing tool of the present invention.
Figure 4:
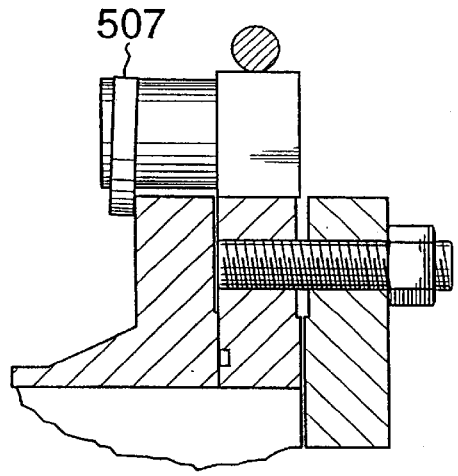
FIG. 4 is a cross sectional view of a second type of fastening means for the flange testing tool of the present invention.

A gasket 504 is disposed between welded flange 501 and flange 502 to provide a seal between these two elements. Flange 501 and flange 502 are then connected using stud and nut combination 505. Alternatively, flange 501 and flange 502 can be connected using a fast-bolt 506, as illustrated in FIG. 3, or by a cam lock system 507 as illustrated in FIG. 4. Primary nut 308 is threaded onto the protruding end of the mandrel to further secure the flange and so that secondary nut 311 can be used for connection of adaptor 314.

The flange test configuration works in a similar manner to the weld test configuration. The tool is charged to a predetermined pressure using hydraulic supply line 317 which is connected through adaptor 314 to conduit 303. Water flows between flange 502 and seal 201, creating pressure and causing seal 201 to be engaged as described above. The pressure can then be monitored to check the integrity of weld 104.

Figure 9:
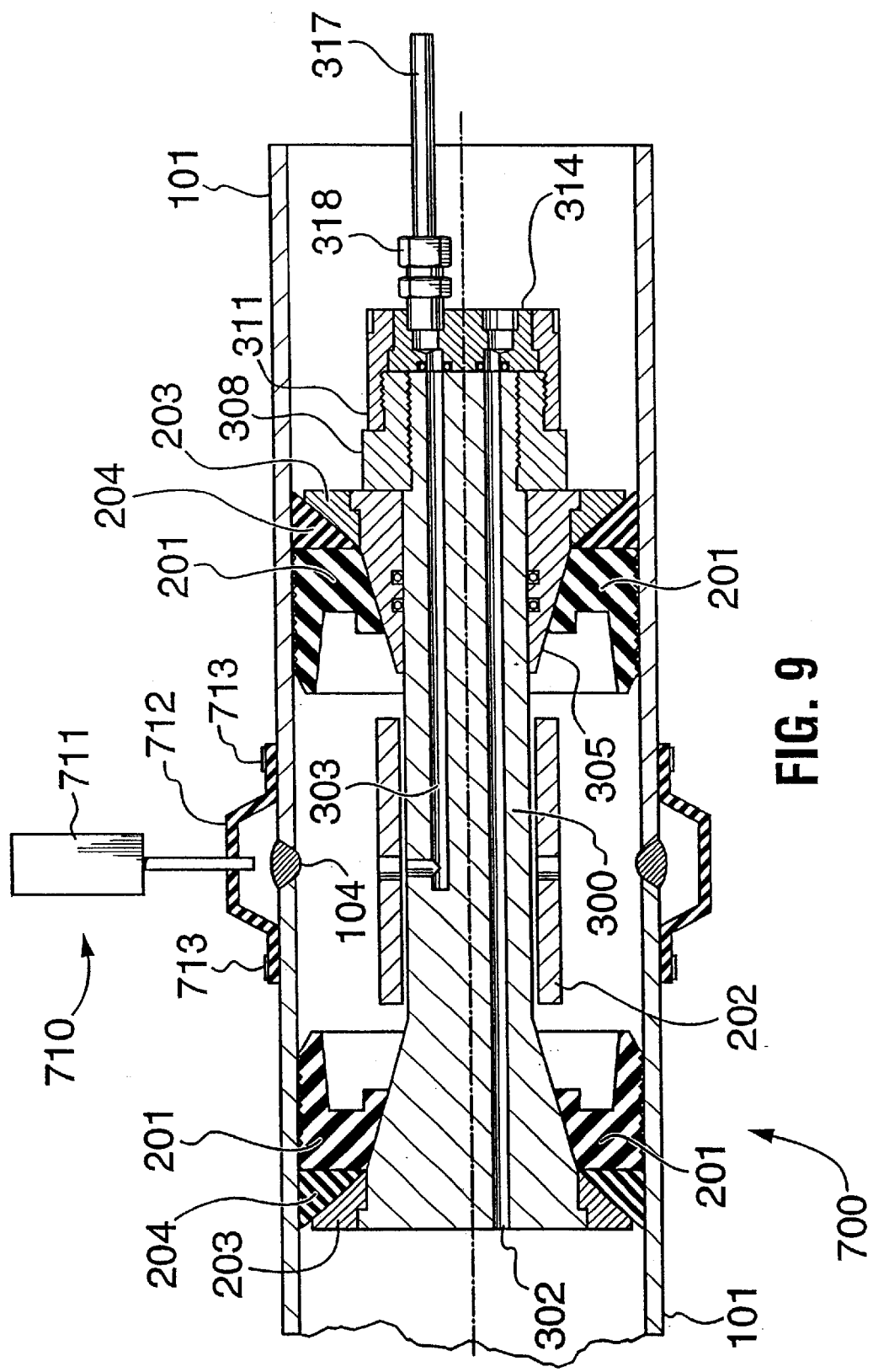
FIG. 9 is a cross sectional view of the present invention in a leak test configuration.

A further alternative configuration of the present invention is illustrated in FIG. 9. FIG. 9 shows a leak test configuration used to test for leaks in weld 104. Leak test configuration 700 is identical to the weld test configuration with the exception of the addition of helium testing unit 710.

Helium testing unit 710 is comprised of sniffer 711, flexible shroud 712, and hose clamps 713. Flexible shroud 712 is placed on pipe 101 around weld 104 and affixed by means of hose clamps 713 on either side of weld 104.

The leak test configuration words similarly to the weld test configuration with the exception that helium is used rather then water. Due to the small size of helium atoms and the properties of helium gas, helium is a better molecule than water for testing for weld leaks. If there are any points along the weld which leak, helium will escape through that point into flexible shroud 712. Sniffer 711 will then detect the presence of helium to confirm a leak.

Figure 10:
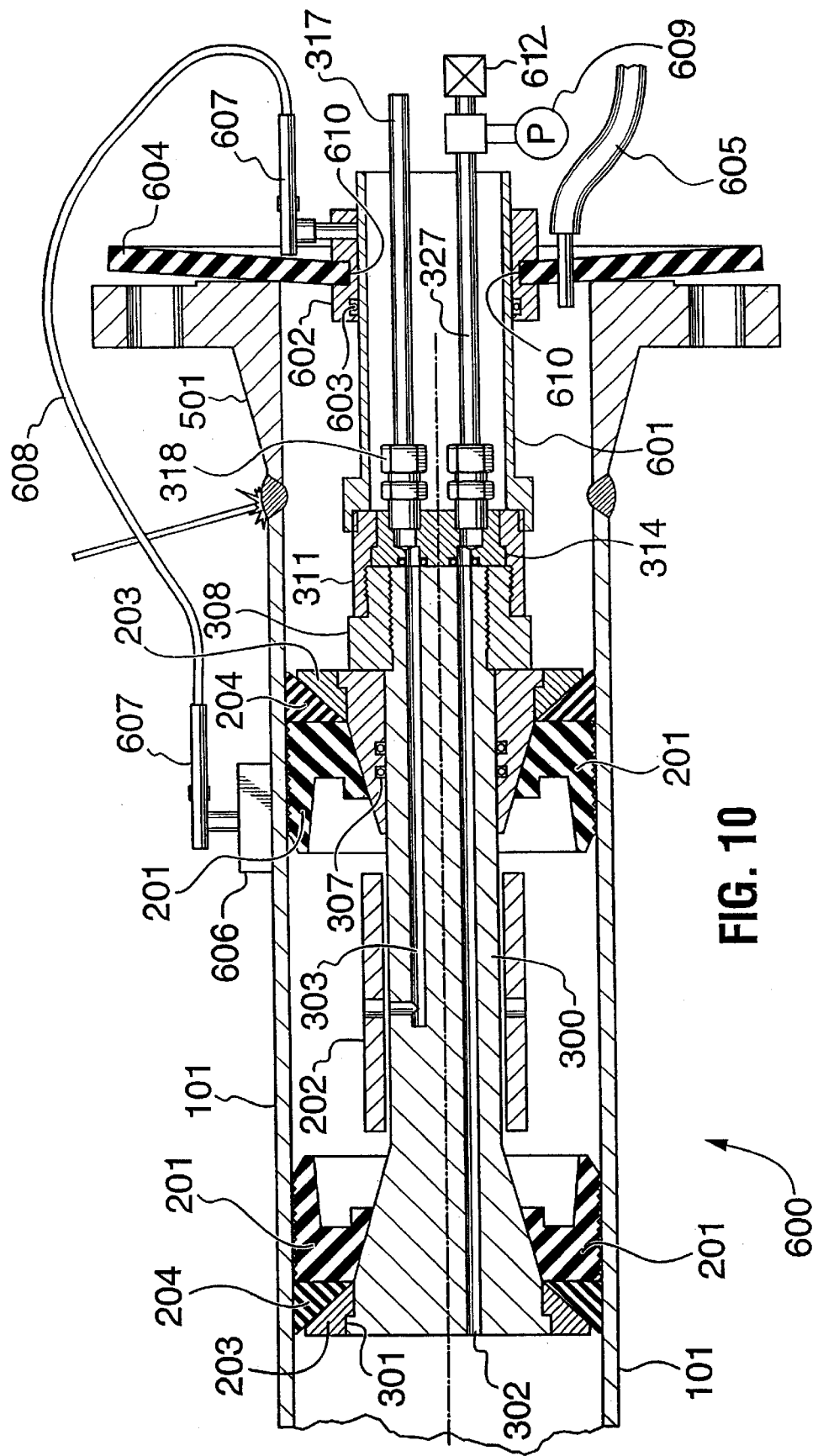
FIG. 10 is a cross sectional view of the present invention in a configuration adapted to isolate a welding area.

A further alternative configuration for the present invention is illustrated in FIG. 10 for use during welding. This configuration is used when welding a pipe which requires a purge gas to be introduced. The use of a purge gas is well known in the art and is generally used when oxygen levels around the weld are to be reduced, such as when welding stainless steel or when TIG welded pipe.

The welding configuration uses the weld test configuration to isolate the down pipe portion of pipe 101. In addition, a shield tube 601 is affixed to secondary nut 311. Shield tube 601 is a hollow metal cylinder that has an inwardly disposed thread on one end for connection to an outwardly disposed thread on secondary nut 311. Shield tube 601 is used to enclose hydraulic lines 317 to protect them from the heat of the weld.

Shield tube 601 is further used to support disk collar 602. Disk collar 602 is a centrally bored cylinder whose inner diameter is approximately the same as the outer diameter of shield tube 601. Disk collar 602 is formed with a circumferentially extending groove 610 on its outer surface to receive an inner edge of disk seal 604. Sealing between disk collar 602 and shield tube 601 is provided by an o-ring 603 which prevents gas from escaping between the two elements.

Disk-seal snap fits into groove 610 of disk collar 602. Disk-seal 604 is made of a flexible material and is used to create a low pressure seal at the end of flange 501, or whatever is being welded to pipe 101.

A purge gas is provided into the area under weld 104 via a purge gas supply line 605 inserted through a hole in disk-seal 604 to allow the inert gas to flow around the weld.

To assist in the welding, a welder's magnet 606 can be attached to pipe 101 to hold a ground clamp 607. Another such clamp 607 can be connected to collar 602. A wire 608 connects the two clamps to prevent an electrical buildup across the weld.

Mandrel 300 can include a second conduit 302 which extends completely through the mandrel. In the configuration shown in FIG. 10, this conduit can be connected to a line 327 including a pressure gauge 609 and a valve 610 that can be used to monitor pressure on the system side of pipe 101 or to vent away off gases or fluids. Further, if a heat sink is required, water can be circulated through the area between seals 201 using conduit 303.

Figure 5:
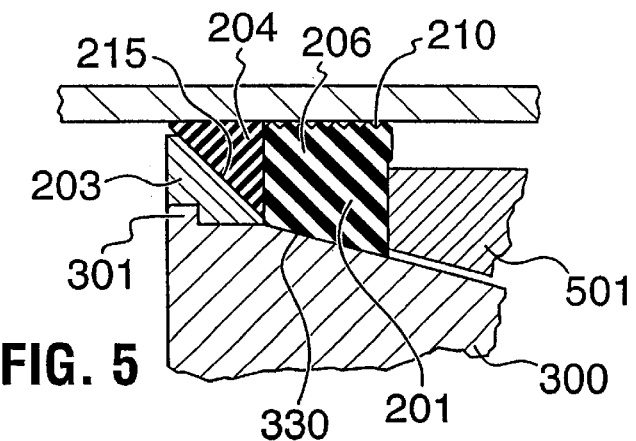
FIG. 5 is a cross sectional view of an alternative sealing means for the present invention, particularity suitable for low pressure applications.

In some applications, there may be insufficient fluid pressure used to fully expand and set seals 201. In such situations, a mechanical preloading force can be applied to the seals in the manner shown schematically in FIG. 5 using for example a torquable nut 501, with fluid pressure acting directly against the seal in the area between the nut and pipe 101. In this application, the seal consists only of section 206 without "lip" 207.

All of the above features provide an illustration of preferred embodiment of the invention, but are not intended to limit the scope of the invention, which is fully described in the claims below.

The embodiments of the invention in which an exclusive property or privilege is claimed are defined as follows:

1. A resilient seal member for sealing against the inner surface of a tubular member to contain fluid pressure, said seal member comprising a first portion normally smaller in outer diameter than the inner diameter of said tubular member and being radially expandable into sealing contact with said inner surface in response to the action of said fluid pressure, and a second portion extending from said first portion at an angle thereto towards said inner surface.

2. The seal member of claim 1 wherein said second portion is a flange-like projection formed integrally with said first portion to extend axially from the side of said first portion exposed to said fluid pressure.

3. The seal member of claim 2 wherein said second portion is normally biased into slidable contact with said inner surface to provide an initial seal thereagainst.

4. The seal member of claim 1 wherein fluid pressure acting against said seal member increases the sealing contact between said second portion and said inner surface, and radially expands said first portion into sealing contact with said inner surface.

5. The seal member of claim 3 wherein fluid pressure acting against said seal member increases the sealing contact between said second portion and said inner surface, and radially expands said first portion into sealing contact with said inner surface.

6. The seal member of claim 1 additionally including a radially expandable member juxtaposed against said first portion on a side thereof opposite from said second portion, said expandable member being expandable into contact with said inner surface of said tubular member concurrently with the radial expansion of said first portion to constrain said seal member against extrusion induced by said fluid pressure.

7. The resilient seal member of claim 6 wherein said expandable member is a spirally split ring of relatively non-compressible material.

8. The resilient seal member of claim 7 wherein said first portion of said seal member is adapted to be disposed concentrically around a cylindrical mandrel that extends axially through said tubular member, said first portion and said mandrel being in sealing contact with one another.

9. The resilient seal member of claim 8 wherein said mandrel includes at least one portion of progressively increasing diameter, said first portion of said seal member moving along said portion of progressively increasing diameter to cause said first portion to radially expand into sealing contact with said inner surface of said tubular member.

10. The resilient seal member of claim 9 wherein a spirally split ring includes a first surface for abutment against said first portion of said seal member and a sloped surface in sliding contact with an oppositely sloped surface of a retaining ring connected to said mandrel for preventing axial separation of a spirally split ring from said mandrel and to limit the axial movement of said first portion along said mandrel.

* * * * *